(12) United States Patent
McCaffrey et al.

(10) Patent No.: US 8,058,615 B2
(45) Date of Patent: Nov. 15, 2011

(54) WIDE SPECTRAL RANGE HYBRID IMAGE DETECTOR

(75) Inventors: Nathaniel J. McCaffrey, Hampton Falls, NH (US); James E. Carey, Waltham, MA (US)

(73) Assignee: SiOnyx, Inc., Beverly, MA (US)

( * ) Notice: Subject to any disclaimer, the term of this patent is extended or adjusted under 35 U.S.C. 154(b) by 462 days.

(21) Appl. No.: 12/363,039

(22) Filed: Jan. 30, 2009

(65) Prior Publication Data

US 2009/0218493 A1 Sep. 3, 2009

Related U.S. Application Data

(60) Provisional application No. 61/089,368, filed on Aug. 15, 2008, provisional application No. 61/032,630, filed on Feb. 29, 2008.

(51) Int. Cl.
*H01L 27/14* (2006.01)

(52) U.S. Cl. .................................................. 250/338.4

(58) Field of Classification Search .... 250/338.1–338.5, 250/339.01, 339.02, 339.14, 342
See application file for complete search history.

(56) References Cited

U.S. PATENT DOCUMENTS

| | | | |
|---|---|---|---|
| 4,201,450 A | 5/1980 | Trapani | |
| 4,242,149 A | 12/1980 | King et al. | |
| 4,277,793 A | 7/1981 | Webb | |
| 4,965,784 A | 10/1990 | Land et al. | |
| 5,234,790 A | 8/1993 | Lang et al. | |
| 5,346,850 A | 9/1994 | Kaschmitter et al. | |
| 5,640,013 A | 6/1997 | Ishikawa et al. | |
| 5,773,820 A | 6/1998 | Osajda et al. | |
| 5,977,603 A | 11/1999 | Ishikawa | |
| 6,080,988 A | 6/2000 | Ishizuya et al. | |
| 6,097,031 A * | 8/2000 | Cole | 250/370.06 |
| 6,420,706 B1 | 7/2002 | Lurie et al. | |
| 6,465,860 B2 | 10/2002 | Shigenaka et al. | |
| 6,475,839 B2 | 11/2002 | Zhang et al. | |
| 6,683,326 B2 | 1/2004 | Iguchi et al. | |
| 6,790,701 B2 | 9/2004 | Shigenaka et al. | |
| 6,800,541 B2 | 10/2004 | Okumura | |
| 6,825,057 B1 | 11/2004 | Heyers et al. | |

(Continued)

FOREIGN PATENT DOCUMENTS

EP 0566156 A1 10/1993

(Continued)

OTHER PUBLICATIONS

Li, "Design and Simulation of an Uncooled Double-Cantilever Microbolometer with the Potential for ~mK NETD," 2004, Sensors and Actuators A, 351-359, vol. 112, Elsevier B.V.

(Continued)

*Primary Examiner* — Constantine Hannaher
*Assistant Examiner* — Marcus Taningco
(74) *Attorney, Agent, or Firm* — Pepper Hamilton LLP (57) ABSTRACT

An apparatus for detecting radiation of a plurality of wavelengths of the electromagnetic spectrum may be provided. The apparatus includes a substrate, a laser irradiated layer proximal to a first side of the substrate, and a microbolometer and at least one readout circuit proximal to a second side of the substrate in electrical communication with the laser irradiated layer. The substrate, laser irradiated layer, and the microbolometer are disposed and arranged such that radiation of a first wavelength is substantially detected by the laser irradiated layer, and radiation of a second wavelength is substantially detected by the microbolometer.

20 Claims, 3 Drawing Sheets

U.S. PATENT DOCUMENTS

| | | | |
|---|---|---|---|
| 6,927,432 | B2 | 8/2005 | Holm et al. |
| 6,984,816 | B2 | 1/2006 | Holm et al. |
| 7,057,256 | B2 | 6/2006 | Carey, III et al. |
| 7,256,102 | B2 | 8/2007 | Nakata et al. |
| 7,354,792 | B2 | 4/2008 | Carey, III et al. |
| 7,390,689 | B2 | 6/2008 | Mazur et al. |
| 7,442,629 | B2 | 10/2008 | Mazur et al. |
| 7,629,582 | B2 * | 12/2009 | Hoffman et al. ......... 250/339.01 |
| 2002/0056845 | A1 | 5/2002 | Iguchi et al. |
| 2002/0148964 | A1 | 10/2002 | Dausch et al. |
| 2003/0029495 | A1 | 2/2003 | Mazur et al. |
| 2006/0006482 | A1 | 1/2006 | Rieve et al. |
| 2006/0132633 | A1 | 6/2006 | Nam et al. |
| 2006/0145148 | A1 | 7/2006 | Hirai et al. |
| 2006/0145176 | A1 | 7/2006 | Lee |
| 2006/0181627 | A1 | 8/2006 | Farrier |
| 2006/0231914 | A1 | 10/2006 | Carey, III et al. |
| 2006/0244090 | A1 | 11/2006 | Roy et al. |
| 2007/0178672 | A1 | 8/2007 | Tanaka et al. |
| 2008/0258604 | A1 | 10/2008 | Mazur et al. |

FOREIGN PATENT DOCUMENTS

| | | | |
|---|---|---|---|
| EP | 1794804 | A2 | 6/2007 |
| GB | 2030766 | A | 4/1980 |
| JP | 57173966 | A | 10/1982 |
| JP | 04318970 | A | 11/1992 |
| JP | 2003163360 | A | 6/2003 |
| JP | 2007-180643 | A | 7/2007 |
| WO | WO 2006086014 | A2 | 8/2006 |
| WO | 2008091242 | A2 | 7/2008 |

OTHER PUBLICATIONS

Moloney, A. M., et al, "Novel Black Silicon PIN Photodiodes," Semiconductor Photodetectors III, Proceedings of the SPIE, 2006, vol. 6119, 61190B-1-61190B-8, Bellingham, Washington.

Oden, P.I. et al, "Optical and Infrared Detection Using Microcantilevers," Infrared Technology and Applications XXII, Proceedings of the SPIE, 1996, vol. 2744, 345-254, Orlando, Florida.

Wu, et al, "Near-Unity Below-Band-Gap Absorption by Microstructured Silicon," 2001, Applied Physics Letters, 1850-1852, vol. 78, No. 13, American Institute of Physics.

Xu, Y., et al, "Infrared Detection Using Thermally Isolated Diode," Sensors and Actuators A, Elsevier Sequoia S.A., 1993, vol. 36, 209-217, Lausanne, Switzerland.

Chien et al, "Pulse Width Effect in Ultrafast Laser Processing of Materials," Applied Physics A, 2005, 1257-1263, 81, Springer Berlin, Heidelberg, Germany.

Nayak et al, "Semiconductor Laesr Crystallization of a-Si:H," SPIE Digital Library, 2003, 277-380, vol. 4977, Bellingham, Washington.

Nayak et al, "Semiconductor Laser Crystallization of a-Si:H on Conducting Tin-Oxide-Coated Glass for Solar Cell and Display Applications," Applied Physics A, 2005, 1077-1080, 80, Springer Berlin, Heidelberg, Germany.

Nayak et al, "Ultrafast-Laser-Assisted Chemical Restructuring of Silicon and Germanium Surfaces," Applied Surface Science, 2007, 6580-6583, vol. 253, Issue 15, Elsevier B.V.

Nayak et al, "Ultrafast Laser Textured Silicon Solar Cells," Mater. Res. Soc. Symp. Proc., 2009, vol. 1123, Materials Research Society.

Zhang et al, "Ultra-Shallow P+-Junction Formation in Silicon by Excimer Laser Doping: a Heat and Mass Transfer Perspective," Int. J. Heat Mass Transfer, 1996, 3835-3844, vol. 39, No. 18, Elsevier Science Ltd., Great Britain.

Bogue, "From Bolometers to Beetles: The Development of Thermal Imaging Sensors," Sensor Review (2007), vol. 27, No. 4, 278-281, Emerald Group Publishing Limited, Bingley, United Kingdom.

Carey, et al., "Fabrication of Micrometer-Sized Conical Field Emitters Using Femtosecond Laser-Assisted Etching of Silicon," Proc. IVMC 2001, 75-76, UC Davis, Davis, CA.

Carey, et al., "Field Emission from Silicon. Microstructures Formed by Femtosecond Laser Assisted Etching," Proc. CLEO 2001 (Baltimore, MD 2001) 555-557.

Carey, et al. "Femtosecond Laser-Assisted Microstructuring of Silicon for Novel Detector, Sensing and Display Technologies", LEOS 2002, 97-98, Glasgow, Scotland.

Carey, et al., "High Sensitivity Silicon-Based VIS/NIR Photodetectors", Optical Society of America (2003) 1-2.

Carey, et al. "Femtosecond Laser-Assisted Microstructuring of Silicon for Novel Detector, Sensing and Display Technologies", LEOS 2003, 481-482, Tuscon, AR.

Carey et al., "Femtosecond-Laser-Assisted Microstructuring of Silicon Surfaces", Optics and Photonics News, 2003. 14, 32-36.

Crouch et al., "Infrared Absorption by Sulfur-Doped Silicon Formed by Femtosecond Laser Irradiation", Appl. Phys. A, 2004, 79, 1635-1641.

Crouch et al., "Comparison of Structure and Properties of Femtosecond and Nanosecond Laser-Structured Silicon" Appl. Phys. Lett., 2004, 84,1850-1852.

Dolgaev et al., "Formation of Conical Microstructures Upon Laser Evaporation of Solids", Appl. Phys. A, 2001, 73, 177-181.

Fowlkes et al., "Surface Microstructuring and Long-Range Ordering of Silicon Nanoparticles", Appl. Phys. Lett., 2002, 80 (20), 3799-3801.

Her et al., "Novel Conical Microstructures Created in Silicon With Femtosecond Laser Pulses", CLEO 1998, 511-512, San Francisco, CA.

Her et al., "Microstructuring of Silicon with Femtosecond Laser Pulses," Applied Physics Letters, 1998, 1673-1675, vol. 73, No. 12, American Institute of Physics.

Her, et al., "Femtosecond laser-induced formation of spikes on silicon," Applied Physics A, 2000, 70, 383-385.

Hu et al., "Solar Cells from Basic to Advanced Systems," McGraw Hill Book Co., 1983, 39, New York, New York.

Pedraza et al., "Surface Nanostructuring of Silicon", Appl. Phys. A, 2003, 77, 277-284.

Pedraza et al., "Silicon Microcolumn Arrays Grown by Nanosecond Pulsed-Excimer Laser Irradiation", Appl. Phys. Lett., 1999, 74 (16), 2322-2324, American Institute of Physics.

Sanchez et al., "Dynamics of the Hydrodynamical Growth of Columns on Silicon Exposed to ArF Excimer-Laser Irradiation", Appl. Phys. A, 1998, 66, 83-86.

Sanchez et al., "Whiskerlike Structure Growth on Silicon Exposed to ArF Excimer Laser Irradiation", Appl. Phys. Lett., 1996, 69 (5), 620-622.

Serpenguzel et al., "Temperature Dependence of Photluminescence in Non-Crystalline Silicon", Photonics West (San Jose, CA, 2004) 454-462.

Shen et al., "Formation of Regular Arrays of Silicon Micorspikes by Femtsecond Laser Irradiation Through A Mask", Appl. Phys. Lett., 82, 1715-1717 (2003).

Solar Energy Research Institute, "Basic Photovoltaic Principles and Methods," Van Nostrand Reinhold Co., NY 1984, pp. 45-47 and 138-142.

Wu et al., "Black Silicon: A New Light Absorber," APS Centennial Meeting (Mar. 23, 1999).

Wu et al., "Femtosecond laser-gas-solid interactions," Thesis presented to the Department of Physics at Harvard University, pp. 1-113, 126-136, Aug. 2000.

Wu et al., "Visible Luminescence From Silicon Surfaces Microstructured in Air". Appl. Phys. Lett., vol. 81, No. 11, 1999-2001 (2002).

Younkin, "Surface Studies and Microstructure Fabrication Using Femtosecond Laser Pulses," Thesis presented to the Division of Engineering & Applied sciences at Harvard University (Aug. 2001).

Younkin et al., "Infrared Absorption by Conical Silicon Microstructures Made in a Variety of Background Gases Using Femtosecond-Laser Pulses", J. Appl. Phys., 93, 2626-2629 (2003).

\* cited by examiner

WIDE SPECTRAL RANGE HYBRID IMAGE DETECTOR

RELATED APPLICATIONS

This application claims the benefit and priority of provisional patent application Ser. No. 61/089,368 filed on Aug. 15, 2008 and provisional patent application Ser. No. 61/032,630 filed on Feb. 29, 2008. This application is related to the commonly assigned U.S. patent application Ser. No. 12/252,101, entitled "Wideband Semiconducting Light Detector" and filed on Oct. 15, 2008 all of which is hereby incorporated by reference.

TECHNICAL FIELD

The present disclosure relates to the detection of electromagnetic radiation, and more particularly, articles for detecting such radiation in a plurality of wavelengths including in the visible and in the infra-red wavelength ranges and to methods for providing detectors.

BACKGROUND

Imagers are useful in recording features of an electromagnetic field, e.g. light, at a detector location and converting the recorded features into an image that can be stored or displayed for various purposes. In the example of every day cameras, imagers capture visible light incident upon a sensitive film or digital array. In analog film systems, the film is altered so as to capture a snapshot in time of the light to which it was exposed. In digital imaging systems, an array of light-sensitive pixels respond to an intensity of incident light at each pixel location, providing an electrical output representative of the incident light. The output of an imager can be referred to as an image.

Motion or video cameras repeat the process described above, but permit a time-sequence to be captured, for example at regular intervals, so that the captured images can be replayed to recreate a dynamic scene or sequence.

Most film and digital pixel imagers include wavelength-specific sensors or detectors. The chemical composition of the film or the design of the digital pixels and associated filters determines the range of wavelengths of light to which the film or pixels respond. Practically, a detector or imager has a frequency response that is optimized to provide images of light in the range of wavelengths the imager is designed for. The most common examples are sensitive to visible light (e.g., red, green, blue, and combinations thereof). Visible light corresponds to the range of wavelengths of electromagnetic radiation to which our eyes are sensitive, and is generally in the range of 400 to 750 nanometers (nm).

Special film and digital pixel imagers are designed for low-light operation to provide night vision capability for military, security, or other special applications in which an illumination source is not available to cause a visible light image. Low-light or night vision imagers rely on detecting and imaging frequencies below (wavelengths longer than) the visible (red) wavelengths, and are sometimes called infra-red (IR) detectors. IR detection is more suited for picking up heat emissions from objects such as a person's body or a vehicle. IR radiation itself can be roughly divided into sub-spectra including the near-infra-red (NIR) having wavelengths between about 750 to 1100 nm, short-wave-infra-red (SWIR) having wavelengths between about 1100 and 2500 nm, medium-wave-infra-red (MWIR) having wavelengths between about 2500 and 8000 nm, and long-wave-infra-red (LWIR) having wavelengths between about 8000 and 12000 nm. These ranges are defined somewhat arbitrarily, and are given merely for simplifying the following discussion, and those skilled in the art will appreciate the generality of the discussion as it relates to the bands of wavelengths of the electromagnetic spectrum.

Present visible light imaging cameras have used silicon devices made with CID, CCD, or CMOS APS architectures. The low cost and efficient collection of photons from 400-750 nm wavelengths has enabled silicon devices. Extending the use of silicon imagers into the near infrared (NIR) band requires a greater volume of material to detect these wavelengths because of silicon's relatively low absorption coefficient in this wavelength range. This increases the size of the detectors and causes increased leakage current and requires expensive manufacturing processes or higher voltages to operate. The use of thick silicon substrates also limits the ability to integrate other devices, and impedes the ability to place circuits under the detector.

SWIR remains mostly undetected by silicon (Si) detectors, which are transparent to this wavelength. The use of exotic detector materials such as indium gallium arsenide (InGaAs) or germanium (Ge) can solve some technical problems but creates others and increases the cost of the products.

With LWIR, direct detection is typically attempted with exotic materials such as HgCdTe cooled to cryogenic temperatures. This is not ideal as such cooled exotic detectors do not lend themselves for practical use in many applications.

A bolometer is one way to detect electromagnetic radiation such as IR. A suspended or cantilevered member, e.g. in a micro electromechanical system (MEMS), responds to detected radiation by way of changes in its resistance or physical dimension to indicate an intensity of the incident radiation. Bolometers can thus be used in arrays as pixels in an imaging system. The deficiencies outlined above with regard to detection or IR and broadband light in traditional detector materials applies to bolometer designs, and thus even with bolometer detectors, present systems are inefficient and impractical over broad ranges of the IR spectrum, notably in or around the IR wavelengths. A microbolometer is a specific type of bolometer. Infrared radiation strikes the detector material, heating it, and thus changing its electrical resistance as mentioned above. This resistance change is measured and can be used to create an image. A microbolometer can absorb and detect MWIR as well as LWIR radiation. Unlike other types of infrared detecting equipment, microbolometers do not require cooling.

Present low-light or night vision IR imagers are usually less sensitive than would be desired, lack color definition, and have limited frequency response. Also, low-light imagers can be more costly, noisy, and require greater circuit resources than visible light imagers to achieve useful gains in low-signal conditions. Furthermore, because long wavelength (IR) light penetrates common detector materials to a greater depth, IR detectors are larger than would be desired for compact portable applications. In summary, present IR detectors are not economical and do not provide good quality imaging, especially over a range of wavelengths that might be desired.

The reading out of information retrieved by imaging array pixels requires significant bussing and addressing circuits. These busses and circuits require additional layers fabricated above the base substrate layers which are located around the optical path of the pixel and can block the incident light along certain paths. As such, the busses and circuits simultaneously reduce the amount of area that the pixel can dedicate to photon collection (sometimes referred to as the pixel fill factor) and generally create a vertical light tunnel for incident light to reach a given pixel. Reducing the pixel fill factor reduces the sensitivity of a device.

An imaging circuit can be characterized by a "device fill factor," corresponding to the fraction of the overall chip area being effectively devoted to the pixel array, and a "pixel fill factor," corresponding to the effective area of a light sensitive photodiode relative to the area of the pixel that may be used to determine the amount of silicon that is photoactive. The device fill factor in conventional devices is less than unity (1.0) because a notable portion of the device beneath the pixel array area cannot be used for processing.

Moreover, the pixel fill factor in conventional devices is typically substantially less than 1.0 because, for example, bussing and addressing circuits are fabricated around the base substrate layers of a pixel. As such, the bussing and addressing circuits limit the amount of space available for photodetection circuitry. Such bussing and addressing circuitry also limit the acceptance cone angle for electrons directed towards an imaging array.

An exemplary conventional CMOS imaging circuit commonly used in the industry, the MT9T001 CMOS Digital Image Sensor from Micron Technology, Inc., has a pixel fill factor of approximately 28% and a device fill factor of approximately 57%. As such, approximately 0.28 times 0.57, i.e. 16% of the semiconductor material of a conventional CMOS imaging circuit is photoactive. In other words, approximately 84% of a CMOS imaging circuit is used for purposes other than the primary purpose of the circuit, which is photodetection. This inefficiency leads to unwanted increased size of the overall product and cost of the product as well as degraded performance of the product made from the conventional photodetector array. An improved photodetector and array is needed that overcomes some or all of the above-mentioned disadvantages.

SUMMARY

From the discussion given above it can be appreciated that better detectors capable of operating at least in the IR wavelength ranges are desirable. The following discussion provides such improved detection methods and apparatus, including methods and apparatus for detecting light in the IR ranges, and for detecting light over a plurality of wavelengths, for example in both an IR range and a visible range. Greater bandwidth detectors allow imaging in a variety of lighting conditions, for example in day and night. Embodiments hereof provide silicon-based imagers and detector elements capable of imaging across a range of electromagnetic wavelengths, including in various portions of the IR spectrum and in a wide range of lighting conditions. Additionally, the present embodiments illustrate compact, thin designs that offer increased sensitivity and resolution at a lower cost than presently available systems. Some embodiments hereof are constructed in the form of bolometers or microbolometers that are incorporated into a semiconductor-based MEMS detector array imager apparatus.

Applications of the present detectors and imagers are also provided where a single imaging product can be made to respond to normal day light as well as low-light or night time conditions. These applications are useful to allow operators to see and record images during a variety of conditions such as military combat, operation of a motor vehicle over terrain, operation of aircraft, gaming applications, medical application, and others.

Specific examples of applications of the present methods and apparatus include systems for targeting during normal and low-light conditions without needing to replace one (day-light) system with another (low-light) system or vice versa. For instance, as used in a rifle scope and sighting article that allows a user to sight and target an object or person, during daytime, nighttime, or indoor ambient light conditions. Other examples include attachments to a helmet visor or goggle apparatus for viewing of surroundings during a plurality of lighting conditions. Yet other examples include enhancements to a windscreen or head-up display (HUD) in vehicles and aircraft operated in a variety of lighting conditions. Still other examples include additions or improvements to industrial, security, gaming products, sport, recreational and medical (e.g., surgical or diagnostic) imaging systems.

In general, in an aspect, an apparatus for detecting radiation of a plurality of wavelengths of the electromagnetic spectrum can be provided. The apparatus includes a substrate, a laser irradiated layer proximal to a first side of the substrate, a microbolometer and at least one readout circuit proximal to a second side of the substrate in electrical communication with the laser irradiated layer. The substrate, laser irradiated layer, and the microbolometer are disposed and arranged such that radiation of a first wavelength is substantially detected by the laser irradiated layer, and radiation of a second wavelength is substantially detected by the microbolometer.

Implementations of the apparatus may include one or more of the following features. The laser irradiated layer substantially blocks at least the radiation of the first wavelength, thereby substantially shielding the at least one readout circuit from exposure to the radiation of the first wavelength. The laser irradiated layer is irradiated with a pulsed laser source. The apparatus further comprises an isolation and bonding layer disposed between the laser radiated layer and the first side of the substrate. The apparatus further comprising at least one via providing electrical communication between the laser irradiated layer and the at least one readout circuit. The apparatus further comprising at least one hybrid via providing electrical communication between the laser irradiated layer and the first side of the substrate.

In general, in another aspect, a method of making a semiconductor detector for detecting at least a portion of the electromagnetic spectrum can be provided. The method includes coupling a microbolometer and at least one readout circuit to a first side of a substrate, forming at least one via through the substrate, to provide electrical coupling between a second side of the substrate and the at least one readout circuit, irradiating a layer of semiconductor material with a laser source, and coupling the laser irradiated layer proximal to the second side of the substrate.

Implementations of the method may include one or more of the following features. The method further comprises positioning the laser irradiated layer with respect the at least on via to be in electrical communication with the at least one via. The irradiating of the layer of semiconductor material comprises applying pulsed laser energy to the layer. The method further comprising annealing the laser irradiated layer.

In general, in another aspect, an apparatus for detecting radiation of a plurality of wavelengths of the electromagnetic spectrum can be provided. The apparatus including a substrate, a laser irradiated layer proximal to a first side of the substrate, a microbolometer and at least one readout circuit proximal to a second side of the substrate, and at least one via providing electrical communication between the laser irradiated layer and the at least one readout circuit wherein the substrate, laser irradiated layer, and the microbolometer are disposed and arranged such that radiation of a first wavelength is substantially detected by the laser irradiated layer, and at least a portion of radiation of a second wavelength penetrates the laser irradiated layer and substrate layer and is substantially detected by the microbolometer.

In general, in another aspect, a hybrid array multi-wavelength imaging device can be provided. The hybrid array includes a first detecting layer, wherein the first detecting layer comprises a laser-processed semiconductor, a base layer disposed substantially beneath the first detecting layer and mechanically coupled to the first detecting layer on a first side of the base layer, wherein the base layer comprises a plurality of microbolometers and a plurality of read out circuits, the plurality of microbolometers and plurality of read out circuits are disposed on a second side of the base layer, and a plurality of vias in electrical communication with the first detecting layer and at least one read out circuit, the plurality of vias are disposed spatially to create a plurality of pixels.

Implementations of the hybrid array multi-wavelength imaging device may include one or more of the following features. The first detecting layer substantially blocks at least radiation of a first wavelength, thereby substantially shielding the plurality of readout circuits from exposure to the radiation of the first wavelength. The plurality of microbolometers comprise a second detecting layer, the second detecting layer detecting radiation of a second wavelength. The first detecting layer is irradiated with a pulsed laser source. The device further comprising an isolation and bonding layer disposed between the first detecting layer and the first side of the base layer. The device further comprising at least one hybrid via providing electrical communication between the first detecting layer and the first side of the base layer.

In general, in another aspect, an array of hybrid pixels may be provided. The array of hybrid pixels includes a plurality of hybrid pixels configured to detect multiple wavelengths each comprising a substrate, a semiconductor layer proximate to a first side of the substrate, wherein at least a portion of the semiconductor layer is processed by a laser, and a microbolometer proximate to a second side the substrate.

Implementations of the array of hybrid pixels may include one or more of the following features. The semiconductor layer is processed by a pulsed laser. The semiconductor layer is mechanically coupled to the first side of the substrate.

The present disclosure also provides methods for creating the present detectors and imaging systems.

Other uses for the methods and apparatus given herein can be developed by those skilled in the art upon comprehending the present disclosure.

BRIEF DESCRIPTION OF THE DRAWINGS

For a fuller understanding of the nature and advantages of the present invention, reference is be made to the following detailed description of preferred embodiments and in connection with the accompanying drawings, in which.

DETAILED DESCRIPTION

As alluded to above, the present disclosure describes systems and articles of manufacture for providing wide-band imagers and methods for making the same. These imagers can be described as in-line, single pixel, "hybrid" detectors which can detect and distinguish between multi-wavelengths. These methods and apparatus are useful in many applications, including applications benefiting from imaging in a variety of light conditions and including night/day imaging. Also, these methods and apparatus can improve imaging through some aerosol obscurations. In some embodiments the imagers and techniques provided herein can be adapted to small, inexpensive, low-power, portable applications such as hand-carried, helmet-mounted and similar applications. In-vehicle and in the field uses are described and will be apparent to those skilled in the art upon reviewing the present disclosure.

Some or all embodiments hereof include a sensor or detector sensitive to certain electromagnetic wavelengths on a semiconductor substrate. In some embodiments, the sensor includes a portion comprising a semiconductor material, for example silicon, which has a portion that is irradiated by a laser to create modified micro-structured surface morphology. In one embodiment the irradiation of the semiconductor material is performed with a short pulse laser. The laser processing can be the same or similar to that described in U.S. Pat. No. 7,057,256 to Carey et al., which is hereby incorporated by reference. The laser-processed semiconductor is made to have advantageous light-absorbing properties. In some cases this type of material has been called "black silicon" due to its visually darkened appearance after the laser processing and because of its enhanced absorption of light and IR radiation compared to other forms of silicon.

Generally, the wavelength of the irradiating laser pulse, its fluence, and pulsewidth can affect the morphology of the microstructured surface. In some embodiments, the laser fluence is preferably selected to be between about 1 kJ/m$^2$ and 12 kJ/m$^2$, but may vary depending on the substrate composition. The choice of the fluence of laser pulses irradiating a silicon wafer to generate a laser processed layer therein can also affect the gettering performance (capacity and/or specificity) of a structured substrate. In general, in various embodiments of the invention, the laser pulse fluence is selected to be greater than about 1 kJ/m$^2$. More preferably, the fluence is chosen to be in a range of about 2 kJ/m$^2$ to about 10 kJ/m$^2$, or a range of about 3 kJ/m$^2$ to about 6 kJ/m$^2$. In some embodiments, the laser-treated layer is irradiated with between 1 and 200 laser pulses of duration in between 20 fs (femtoseconds) and 200 ps (picoseconds).

Additionally, the laser pulse length can affect the morphology and absorption properties of the treated silicon. Irradiation of a substrate according to the invention can be with femtosecond laser pulses or picosecond or nanosecond pulses. Other factors that can affect microstructures morphology include laser polarization and laser propagation direction relative to the irradiated silicon surface.

In some embodiments, the laser microstructuring of a substrate is performed in the presence of a mixture of two or more substances where needed to accomplish the present purposes. For example, silicon samples treated in the presence of a mixture of $SF_6$ and $Cl_2$ exhibit an increase in the microstructure density at higher partial pressure of $SF_6$.

Figure 1:
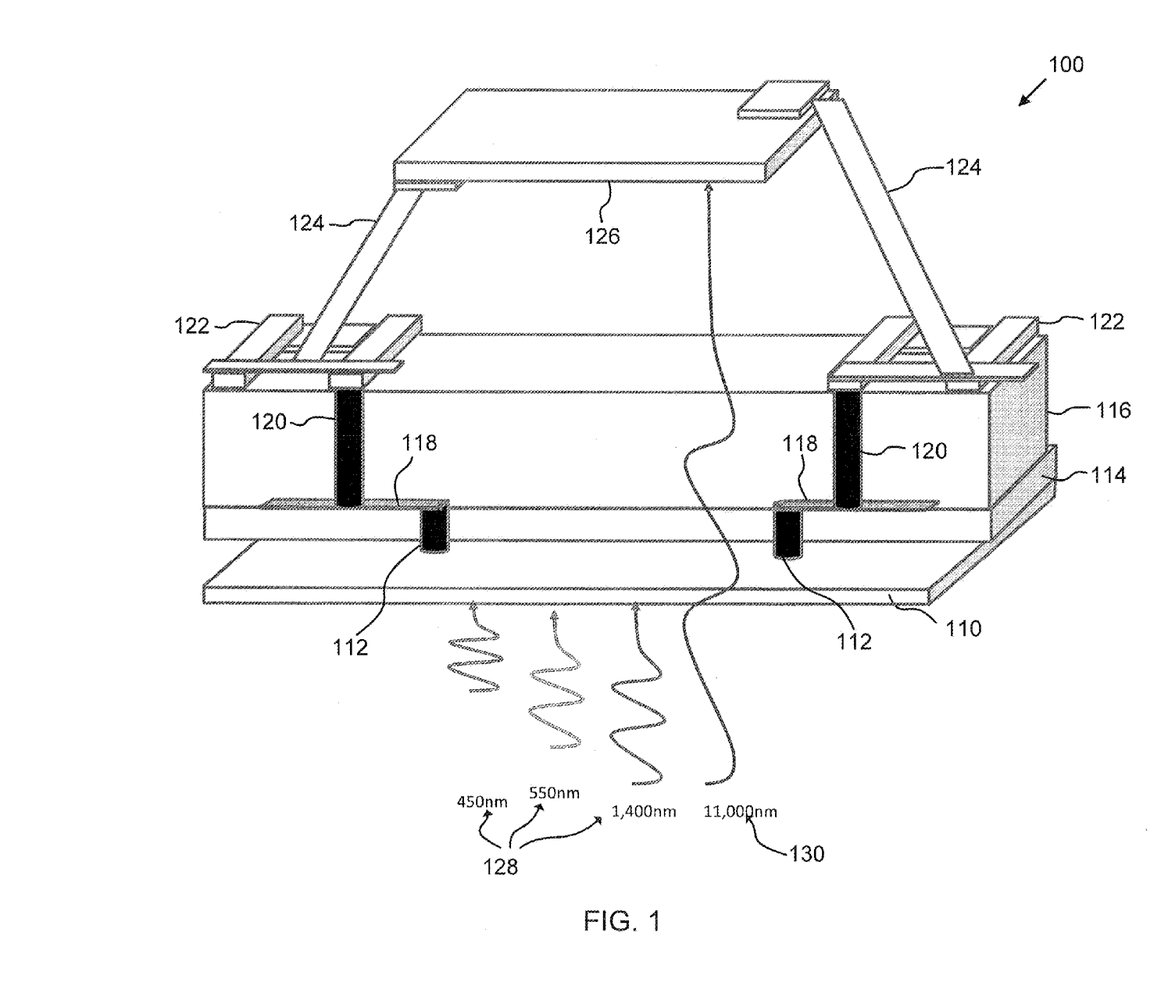
FIG. 1 illustrates an exemplary circuit and detector element arrangement.

We now turn to a description of an exemplary apparatus for detecting electromagnetic radiation or light in at least a range of wavelengths of the electromagnetic spectrum. FIG. 1 illustrates an exemplary and simplified representation of a multi-wavelength detector 100 for enhanced detection of visible and IR ranges of wavelengths and responsive to incident radiation 128, 130. Detector 100 includes a laser-treated layer 110, a plurality of hybrid vias 112, an isolation and bonding layer 114, a substrate 116, a plurality of via connector elements 118, a plurality of through substrate vias 120, readout circuits 122, electrical connection and thermal isolation legs 124, and a LWIR detecting microbolometer 126.

In the exemplary arrangement of FIG. 1, the detector 100 includes the laser-treated layer 110. The laser-treated layer 110, may be a semiconductor material (e.g. silicon), which is irradiated by a short pulse laser to create modified microstructured surface morphology as described above. The laser-treated layer 110 may be mechanically coupled to the detector 100 and specifically to the isolation and bonding layer 114. The laser-treated layer 110 may be coupled to the isolation and bonding layer 114, through numerous methods including but not limited to; adhesives, press-fit, or mechanical fasteners. An electrical connection may be made at a pixel pitch dimension. The mechanical connections can be made at fewer points and farther spaced distances. In a first approach, a ductile metal is patterned on the substrate connections. The detector layer is then positioned above the substrate with the ductile metal bumps in between. When the pixels are registered or aligned, a mechanical pressure is applied until the two layers are connected electrically at the pixel dimension. This is generally called bump bonding. In another approach two layers are brought together with connections made with conductors on both sides. The areas that will not require electrical conductivity may be patterned with an appropriate insulative material (i.e. silicon dioxide). The connections may be aligned using Vander-Walls forces and the mechanical connection can provided by these forces on substantially flat material layers.

The laser-treated layer 110 may be configured such that incident radiation 128, 130 strikes a first side of the laser-treated layer 110. The first side of the laser-treated layer 110 may also be considered the "front" side of the laser-treated layer 110, and of the overall detector 100, since it is the side which the incident radiation 128, 130 strikes and it is opposite or distal from the side of the laser-treated layer 110 that is coupled to the isolation and bonding layer 114 as described above. In some embodiments, the laser-treated layer 110 may be a contiguous sheet of material to the substrate 116. The laser-treated layer 110 may absorb and thereby detect a substantial portion of certain wavelengths of radiation 128. The radiation 128 that is absorbed and detected by the laser-treated layer 110 may include visible light, NIR, and SWIR, as well as in some embodiments, MWIR It should be noted that in alternate embodiments, that the laser-treated layer 110 and the microbolometer 126 can each be configured to absorb a portion or all of the MWIR radiation incident on the detector 100. The radiation 128 that is absorbed in the laser-treated layer 110 creates an electron-hole pair according to the photodetection process. The photogenerated carrier can be collected in a storage site and read out. Either electrons or holes can be stored and transferred. The charge created at a pixel site is in proportion to the incident light level present. The aggregate effect of an array of pixels in an imaging system is to produce a spatially sampled representation of a continuous scene.

The plurality of hybrid vias 112 may serve to electrically couple the laser-treated layer 110 to the detector 100 and specifically to the readout circuits 122 through the plurality of via connector elements 118 and the plurality of through substrate vias 120. In some embodiments, the laser-treated layer 110 may be a sheet of material covering the entire pixel array of a detector and the laser-treated layer 110 may be contiguous to the substrate 116. The hybrid vias 112 can transmit electrical signals through the isolation and bonding layer 114. The hybrid vias 112 may be constructed from a metal or other appropriate type of electrically conductive material. The terminal ends of the hybrid vias 112 may be electrically coupled to the through substrate vias 120 by the connector elements 118. In some embodiments, the hybrid vias 112 can be considerably larger than the through substrate vias 120. The connector elements 118 are electrically conductive and in some embodiments, reduce or eliminate the need for precise alignment during the process of mating the laser-treated layer 110 to the substrate 116. The connector elements 118 may be configured in many appropriate physical shapes including but not limited to substantially flat disks, washers, bars, or strips. The connector elements 118 may include an appropriate metal or other type of electrically conductive material.

The isolation and bonding layer 114 may be configured and designed to be adjacent to the laser-treated layer 110 on a first side and adjacent to the substrate 116 on a second side. The isolation and bonding layer 114 may provide electrical and thermal isolation between the laser-treated layer 110 and the substrate layer 116. In some embodiments, the electrical connection is made from the laser-treated layer 110 through the vias and connectors 112, 118, and 120 to the appropriate readout circuits 122. The isolation and bonding layer 114 may provide a mechanism to mechanically couple the laser-treated layer 110 to the rest of the detector 100 (and specifically to substrate 116) as described above. The isolation and bonding layer 114 may include a material such as silicon dioxide that provides the proper electrical isolation characteristics as well as the appropriate material properties to enable adhesive or other types of mechanical bonding as described above. The isolation and bonding layer 114 may create an atomically clean and substantially flat interface for the layers in the case of molecular force bonding and it also isolates discrete connection points for both ductile metal and molecular force bonding techniques. For other bonding approaches, discrete connection points within the pixel element may be required and an isolation layer provides these discrete nodes.

In some embodiments the substrate 116 provides a structural base upon which the readout circuits 122, and a LWIR detecting microbolometer 126 can be constructed. The substrate 116 can also be the structural base to which the isolation and bonding layer 114 may be attached. In one embodiment, the isolation and bonding layer 114 can be attached to the substrate 116 on a side opposite of the side of the substrate 116 which readout circuits 122, and a LWIR detecting microbolometer 126 can be constructed.

The through substrate vias 120 may be configured and disposed to be in electrical communication with the connector elements 118 at a first end and to be in electrical communication with at least one of the readout circuits 122 at a second end of the vias. A through substrate via configuration can transfer electrical signals to the back surface, e.g. opposite the surface which incident radiation strikes, of the substrate 116 where lithographically prepared readout circuits 122 can distinguish between the signals from both the laser-treated layer 110, and the LWIR detecting microbolometer 126 and output the information to off-chip processing and display circuits (which are not shown).

Using common readout electronics 122 allows wide spectral band image processing at the pixel level. The charge integrated at the pixel can be sampled at the pixel level and this signal can be directed to the output readout circuits by the amplifiers and switches in the pixel circuitry. With dual band collection (i.e. a bolometer and a black silicon detector), these two signals can be read out as two discrete signals or combined at the pixel level with mixer elements (amplifiers) to simplify the readout raster or reduce the bandwidth of the circuit (only 1 signal per pixel rather than 2). Contrast enhancement, gain and exposure control, and enhanced edge detection are some examples of the benefits that may be implemented via the methods and systems described herein. Segregating the readout circuits 122 to the back surface of the substrate may reduce the processing and fabrication complexity and may be more aligned with standard low cost semiconductor processes, e.g. CMOS, BiCMOS, bipolar, NMOS, PMOS or CCD. The area under the microbolometer 126 can be designed to be free from circuits that would block the LWIR photons 130 from reaching the microbolometer 126. Readout circuits 122 can be placed at the periphery of the stacked detectors. In some embodiments, the use of a laser-treated layer 110 on the front side of the detector 100 may allow an improved (e.g. substantially 100%) fill factor for certain wavelengths of radiation. The laser-treated layer 110 also blocks unwanted wavelengths of light 128 from reaching and corrupting the readout circuitry 122. Some embodiments reduce or eliminate the need for a separate IR blocking layer or filter from the camera to reduce device and camera costs and complexity.

Some disclosed embodiments may increase the sensitivity and reduce the complexity of the lens design as longer wavelengths are focused deeper in the optical path of the detector 100. In optics, chromatic aberration is caused by a lens having a different refractive index for different wavelengths of light (the dispersion of the lens). Chromatic aberrations of devices drive longer wavelengths to focus deeper and providing an imager with these inherent characteristics reduces the chromatic tolerance required for both design and manufacture. In general, in both refractive and catadioptric systems, shorter wavelength light is refracted more than longer wavelength light. Some embodiments separate visible light 128 from LWIR 130 detection depth by up to 3500 micro-meters. A catadioptric optical system is one which contains both lenses and mirrors. A catadioptric lens system can be used for a long focal length instrument that is "folded" into a much smaller physical package and very wide spectral range as is often used in range finding and sighting systems such as sniper sights. A catadioptric lens system greatly reduces or eliminates chromatic aberration which is a major problem with long refractive lenses.

The LWIR detecting microbolometer 126, which may be undoped silicon, is supported by and mechanically coupled to substrate 116 by the electrical connection and thermal isolation legs 124. The electrical connection and thermal isolation legs 124 are designed to be substantially electrically conductive but substantially thermally isolating.

Microbolometers can be made from many materials including amorphous silicon and vanadium oxide. These microbolometers can capture LWIR radiation 130 and sense changes in the material properties of the microbolometer due to the absorption of the LWIR photons 130. The LWIR radiation 130 passes through many materials including silicon substrates. Thus, the LWIR detecting microbolometer 126, may be positioned on the back surface (opposite the surface which incident radiation strikes) of the detector 100 to capture the LWIR photons 130 which substantially pass through the laser-treated layer 110, the isolation and bonding layer 114, and the substrate 116. Black silicon can be responsive to illumination from visible light wavelengths to medium wave infrared (400 nm-8000 nm) wavelengths. A bolometer responds to longer wavelengths that extend from (8000-12000 nm), known as the long wave infrared, but in some embodiments may also be configured to absorb MWIR. The long wave infrared is also known as the thermal band as it detects the radiation emitted by common objects like human bodies and vehicles.

It can be appreciated that a plurality of detectors like detector 100 can be arranged, for example in two dimensions along some surface, to give a two-dimensional pixel field indicative of a characteristic (e.g., intensity) of incident radiation 128, 130 along the surface of the surface. An array or grid of detectors 100 can be constructed along (N) rows and (M) columns to yield a M-by-N array. This array of individual detector pixels 100 can now be connected to imaging circuitry to form an image corresponding to the characteristic (e.g., intensity) of incident radiation 128, 130 in two dimensions.

Note that auxiliary features of the detector 100 can be added or modified from that shown in FIG. 1 without substantially departing from the essence of the operation of the device.

Figure 2:
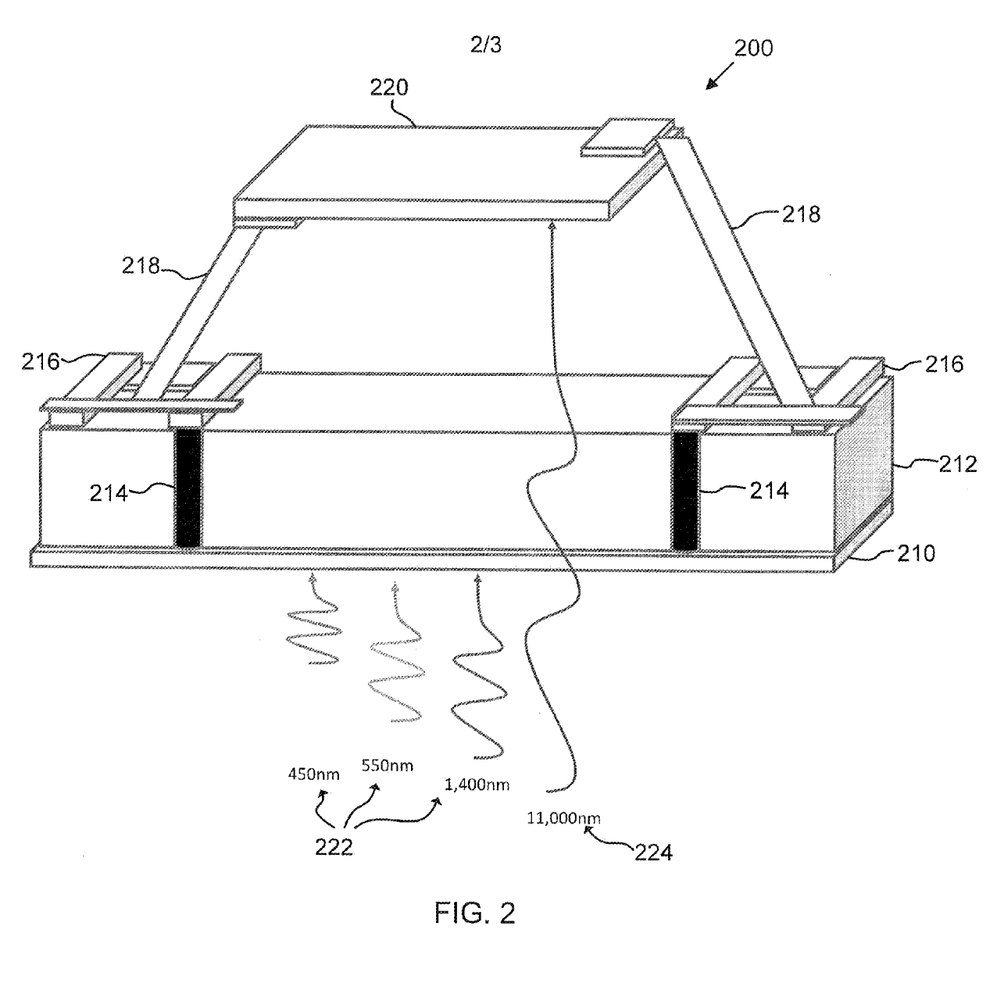
FIG. 2 illustrates another exemplary circuit and detector element arrangement with a laser-treated layer adjacent to the substrate.

FIG. 2 illustrates another exemplary and simplified embodiment of a detector 200 adapted to detect at least a portion of the spectrum of incident electromagnetic radiation 222, 224. Detector 200 includes a laser-treated layer 210, a substrate 212, a plurality of through substrate vias 214, readout circuits 216, electrical connection and thermal isolation legs 218, and a LWIR detecting microbolometer 220.

In the exemplary arrangement of FIG. 2, the detector 200 includes the laser-treated layer 210. The laser-treated layer 210, may be a semiconductor material (e.g. silicon), which is irradiated by a short pulse laser to create modified microstructured surface morphology as described above. The semiconductor material that becomes the laser-treated layer 210 after the laser processing, may be deposited on a front side of the substrate 212 via many processes including but not limited to chemical deposition, physical deposition, and sputtering. The laser-treated layer 210 may be configured such that incident radiation 222, 224 strikes a first side of the laser-treated layer 210. The first side of the laser-treated layer 210 may also be considered the "front" side of the laser-treated layer 210, and of the overall detector 200, since it is the side which the incident radiation 222, 224 strikes and it is opposite or distal from the side of the laser-treated layer 210 that is adjacent to the substrate 212.

The substrate 212 can provide a structural base upon which the readout circuits 216, and a LWIR detecting microbolometer 220 can be constructed. The substrate 212 can also be the structural base onto which a semiconductor layer can be deposited to be laser-processed.

The remainder of detector 200 including the through substrate vias 214, readout circuits 216, electrical connection and thermal isolation legs 218, and a LWIR detecting microbolometer 220 may be substantially similar to the corresponding components of detector 100 as described above with respect to FIG. 1. The detector 200 shown in FIG. 2 lacks the isolation and bonding layer 114, the hybrid vias 112, and the via connectors 118 of detector 100 shown in FIG. 1.

As discussed above with respect to FIG. 1, an array or two dimensional grid of pixel detectors 200 can be used to create an imaging apparatus that provides an image representation of the incident radiation 222, 224 impinging on the row and column pixels of the imager. A suitable readout circuit can create the image representation, which can be still (snapshot) frame or moving (dynamic) time-sequenced. The output of the imager can be recorded to a recording device such as a disk or tape, or can be displayed in real time to a user on a screen, or can be transmitted for remote processing or storage elsewhere.

Figure 3:
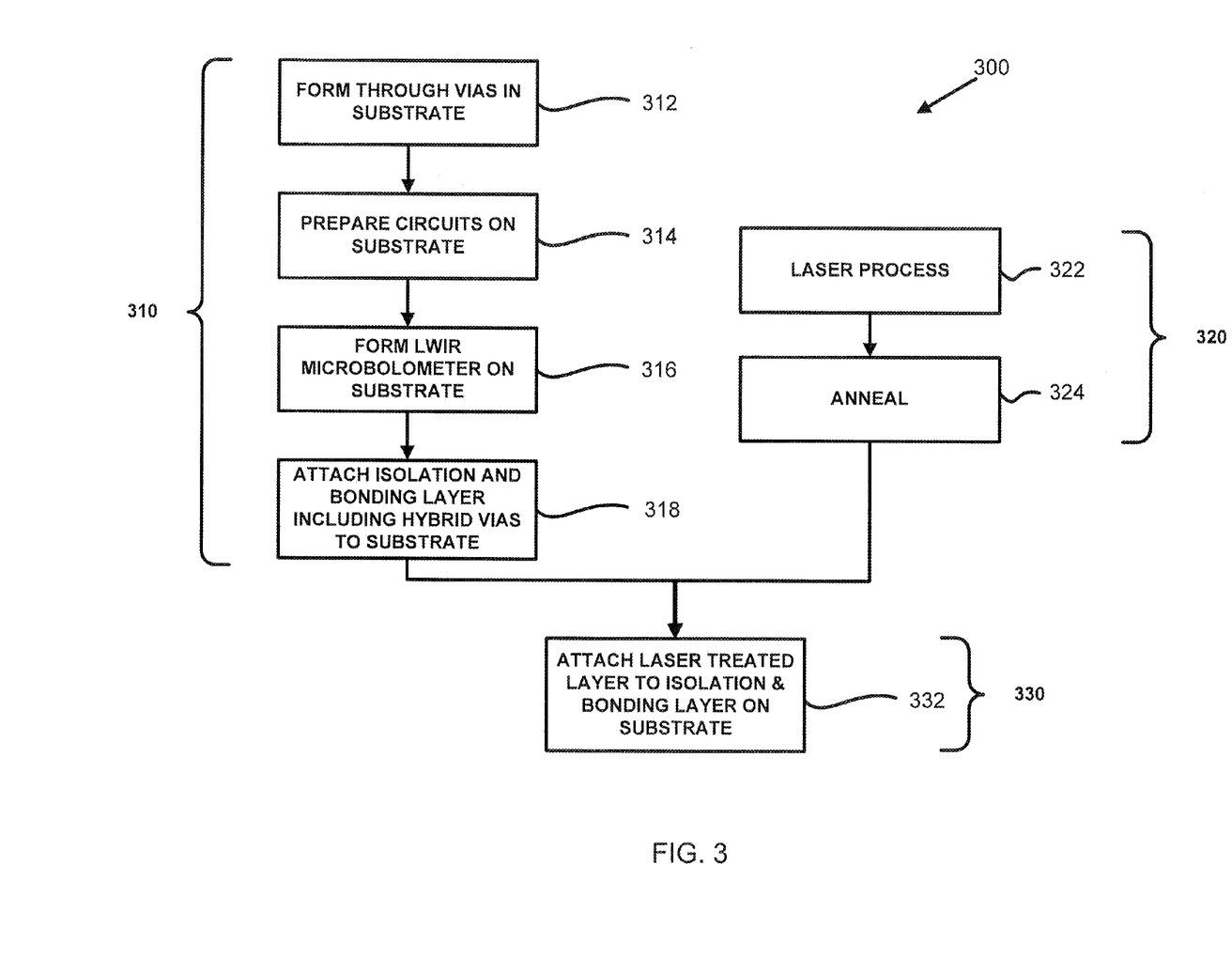
FIG. 3 illustrates a flow chart of various stages of an exemplary process for manufacturing the exemplary circuit and detector element arrangement shown in FIG. 1.

Referring to FIG. 3, with further reference to FIG. 1, a method 300 for making an electromagnetic radiation detector 100 as described above may include a first process 310, a second process 320, and a third process 330. The method 300 is exemplary only and not limiting. The method 300 may be modified, e.g., by adding, removing, or rearranging the processes and stages shown and may be performed in a sequence chosen to suit a given purpose at hand. The steps of the present illustrative processes may be consistent with the foregoing descriptions given herein.

The first process 310 includes forming through vias in a substrate layer stage 312, preparing readout circuits on the substrate layer stage 314, forming a LWIR microbolometer on the substrate stage 316, and attaching an isolation and bonding layer which includes hybrid vias to the substrate stage 318. The process 310 is exemplary only and not limiting. The process 310, and further all processes discussed herein, are exemplary only and not limiting and may be modified, e.g., by adding, removing, or rearranging the stages shown.

The forming of through vias in the substrate layer stage 312 may include drilling through holes or apertures in the substrate and depositing or forming metal or other electrical conductive material in the drilled holes. The through vias may also be formed through anisotropic wet etching, plasma etching, or sputter etching.

The preparing of readout circuits on the substrate layer stage 314 may be performed with the deposition of material layers, patterning of these layers by photolithography and then etching to produce the required shapes. Standard CMOS photolithography processes used in semiconductor manufacturing of integrated circuits may be utilized for the formation of the readout circuits. The readout circuits may be positioned and configured so that they are electrically coupled to the through vias that penetrate the substrate layer.

The forming a LWIR microbolometer on the substrate stage 316 may include providing electrical connection and thermal isolation legs. The electrical connection and thermal isolation legs may be coupled electrically to the readout circuits on the substrate layer.

The attaching of the isolation and bonding layer stage 318 can be performed on a side of the substrate opposite the readout circuits and microbolometer. The isolation and bonding layer may include a plurality of hybrid vias. The plurality of hybrid vias may be configured and arranged to be in electrical connection with the through vias.

The second process 320 includes a laser-processing stage 322 and an annealing stage 324.

The laser-processing stage 322 may include irradiating a semiconductor material, e.g. silicon, with a pulsed laser source as described above. In some embodiments, a non-pulsed laser may be used to irradiate the semiconductor material. Those skilled in the art will appreciate that varying the laser wavelength from about 150 nm to about 20000 nm and varying the intensity from about 10 W/cm$^2$ to about $10^9$ W/cm$^2$ may achieve the same results as a pulsed laser system.

The annealing stage 324 may be carried out through any means of annealing (e.g. Rapid thermal annealing, laser annealing, furnace annealing). In some embodiments, the laser processed layer may be annealed in a gas flow oven, at various temperatures between 300 C and 1200 C, with the temperature determined by design parameters and characteristics. The substrate including the laser processed layer may be heated to the annealing temperature and held for approximately ten minutes. In other embodiments, the required annealing time may be significantly more or less as required by the system and design constraints. During the anneal process, the gas flow in the oven may be held constant for the entire anneal process to prevent oxygen diffusion into the surface.

The first and second processes 310, 320 do not necessarily have to be performed at the same time or location. In one embodiment, the first and second processes 310, 320 are performed separately to avoid contamination of the laser-treated layer or adverse effects on the readout circuits or microbolometer from the laser processing.

The third process 330 includes attaching the laser-treated layer to the isolation and bonding layer on substrate stage 332. The process 330 may be modified by incorporating one or more of the aforementioned stages as appropriate in the third process 330. The stage 332 of attaching the laser-treated layer to the isolation and bonding layer on the substrate combines the results of the first process 310 and the second process 320 to form a detector 100 as described above with reference to FIG. 1. The attachment of the laser-treated layer may be performed through numerous methods including but not limited to: adhesives, press-fit, or mechanical fasteners. The stage 332 of attaching the laser-treated layer may be performed so that the laser-treated layer is configured and disposed to be the front layer of the detector 100 upon which incident electromagnetic radiation first strikes.

Another feature of the present embodiments that facilitates its use in practical applications is that the present laser-treated silicon is compatible with most standard CMOS readout circuit substrates.

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. An apparatus for detecting radiation of a plurality of wavelengths of the electromagnetic spectrum, the apparatus comprising:
   a substrate;
   a laser irradiated layer proximal to a first side of the substrate; and
   a microbolometer and at least one readout circuit proximal to a second side of the substrate in electrical communication with the laser irradiated layer;
   wherein the substrate, laser irradiated layer, and the microbolometer are disposed and arranged such that radiation of a first wavelength is substantially detected by the laser irradiated layer, and radiation of a second wavelength is substantially detected by the microbolometer.

2. The apparatus of claim 1 wherein the laser irradiated layer substantially blocks at least the radiation of the first wavelength, thereby substantially shielding the at least one readout circuit from exposure to the radiation of the first wavelength.

3. The apparatus of claim 2 wherein the laser irradiated layer is irradiated with a pulsed laser source.

4. The apparatus of claim 3 further comprising an isolation and bonding layer disposed between the laser irradiated layer and the first side of the substrate.

5. The apparatus of claim 1, further comprising at least one via providing electrical communication between the laser irradiated layer and the at least one readout circuit.

6. The apparatus of claim 5, further comprising at least one hybrid via providing electrical communication between the laser irradiated layer and the first side of the substrate.

7. A method of making a semiconductor detector for detecting at least a portion of the electromagnetic spectrum, the method comprising:

coupling a microbolometer and at least one readout circuit to a first side of a substrate;

forming at least one via through the substrate, to provide electrical coupling between a second side of the substrate and the at least one readout circuit;

irradiating a layer of semiconductor material with a laser source; and coupling the laser irradiated layer proximal to the second side of the substrate.

8. The method of claim 7 further comprising positioning the laser irradiated layer with respect the at least on via to be in electrical communication with the at least one via.

9. The method of claim 6 wherein the irradiating of the layer of semiconductor material comprises applying pulsed laser energy to the layer.

10. The method of claim 8 further comprising annealing the laser irradiated layer.

11. An apparatus for detecting radiation of a plurality of wavelengths of the electromagnetic spectrum, the apparatus comprising:

a substrate;

a laser irradiated layer proximal to a first side of the substrate;

a microbolometer and at least one readout circuit proximal to a second side of the substrate; and at least one via providing electrical communication between the laser irradiated layer and the at least one readout circuit;

wherein the substrate, laser irradiated layer, and the microbolometer are disposed and arranged such that radiation of a first wavelength is substantially detected by the laser irradiated layer, and at least a portion of radiation of a second wavelength penetrates the laser irradiated layer and substrate layer and is substantially detected by the microbolometer.

12. A hybrid array multi-wavelength imaging device, comprising:

a first detecting layer, wherein the first detecting layer comprises a laser-processed semiconductor;

a base layer disposed substantially beneath the first detecting layer and mechanically coupled to the first detecting layer on a first side of the base layer, wherein the base layer comprises a plurality of microbolometers and a plurality of read out circuits, the plurality of microbolometers and plurality of read out circuits are disposed on a second side of the base layer; and a plurality of vias in electrical communication with the first detecting layer and at least one read out circuit, the plurality of vias are disposed spatially to create a plurality of pixels.

13. The device of claim 12 wherein the first detecting layer substantially blocks at least radiation of a first wavelength, thereby substantially shielding the plurality of readout circuits from exposure to the radiation of the first wavelength.

14. The device of claim 13 wherein the plurality of microbolometers comprise a second detecting layer, the second detecting layer detecting radiation of a second wavelength.

15. The device of claim 14 wherein the first detecting layer is irradiated with a pulsed laser source.

16. The device of claim 15 further comprising an isolation and bonding layer disposed between the first detecting layer and the first side of the base layer.

17. The device of claim 16, further comprising at least one hybrid via providing electrical communication between the first detecting layer and the first side of the base layer.

18. An array of hybrid pixels comprising:

a plurality of hybrid pixels configured to detect multiple wavelengths each comprising a substrate;

a semiconductor layer proximate to a first side of the substrate, wherein at least a portion of the semiconductor layer is processed by a laser; and a microbolometer proximate to a second side the substrate.

19. The array of claim 18 wherein the semiconductor layer is processed by a pulsed laser.

20. The array of claim 19 wherein the semiconductor layer is mechanically coupled to the first side of the substrate.

* * * * *